May 22, 1928.  
R. MERCIER  
1,670,897
BRAKE MAGNET ADJUSTMENT
Filed July 22, 1925
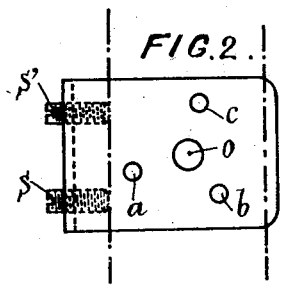
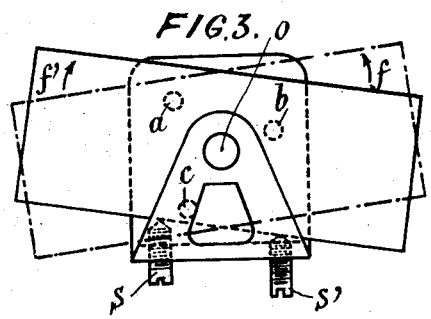
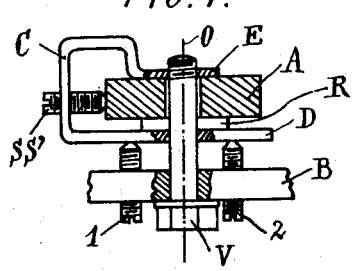
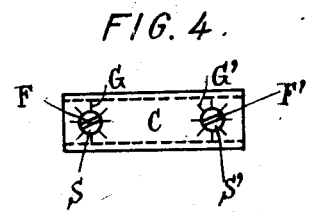
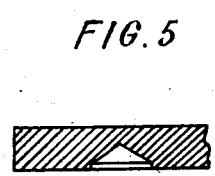
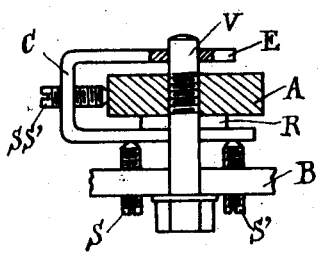
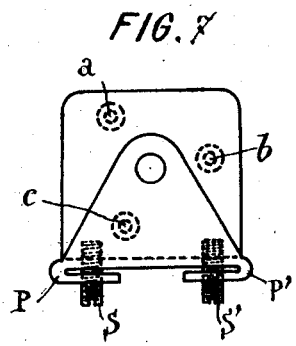

Patented May 22, 1928.

1,670,897

UNITED STATES PATENT OFFICE.

RENÉ MERCIER, OF PARIS, FRANCE, ASSIGNOR TO COMPAGNIE CONTINENTALE POUR LA FABRICATION DES COMPTEURS & AUTRES APPAREILS, OF PARIS, FRANCE.

BRAKE-MAGNET ADJUSTMENT.

Application filed July 22, 1925, Serial No. 45,438, and in France November 21, 1924.

The speed of the movable element of an electric meter is usually regulated by means of a Foucault damping device which consists of a permanent magnet acting upon a conducting disk.

This regulation is obtained either by more or less shunting the magnet, or by displacing it so as to cover more or less of the surface of the conducting disk.

The control by the displacement of the magnet must fulfill the following conditions; in the displacement, the air gap of the magnet should remain parallel with the Foucault disk, and the displacement must also be micrometric in both directions, without loss of time. On the other hand, this adjustment should be made without interfering with the main screw for fastening the magnet, which thus remains tight in all positions.

This latter point is practically the most important, for in the major part of the known regulating methods, it is necessary to loosen the principal screw V in order to displace the magnet, and then to tighten it in order to hold it in the proper position, but by this action the adjustment is usually destroyed.

Figs. 1, 2, 3 and 4 show respectively in vertical section, bottom view, plan, and side view, the whole device according to the invention, and in Fig. 5 a detail of the principal member. Figs. 6 and 7 are modifications. Fig. 8 is an enlarged sectional detail.

The device consists of a member which is bent into U shape, or fork, C, which in plan view has the shape of a V, and comprises between its branches the magnet A, the said member and the magnet being traversed by a common bolt or screw V which also serves to secure the whole device to the frame B of the apparatus.

The lower branch or base portion of the fork C, upon which is disposed the magnet, is provided on the face adjacent the frame B with three recesses $a$, $b$, $c$ (Fig. 2 and Fig. 5) which are not pierced through and are of tapered form, for example, in which are inserted, without play, the ends of the three screws, two of which only are illustrated in the drawings, which serve according to a known method to regulate the height and the inclination relatively to the plane of the branch or base D, which after the screws are tightened will be secured to the main frame.

The magnet is also secured to the fork C by the screw V which passes through it, and by the two screws S S'. The magnet may rotate about the axis O, represented by the bolt or screw V, in the direction of the arrow $f$, when the screw S is unscrewed and when the screw S' is gradually screwed into the fork C.

The movement takes place in the same manner, in the contrary direction $f'$, when the screw S' is unscrewed and the screw S is screwed in.

The movement may be made as gradual as desired by forming upon the part C the circular graduations G, G', Fig. 4, which are centered upon the axis of the screws S and S' and whose lines serve as checking marks relatively to the slots F and F' of the respective screws S and S'.

When the movement is terminated, one screws to the limit the screw S or S' which had been loosened, and the magnet is thus secured in the regulated position.

A washer of suitable size, placed between the base D and the magnet A, will much reduce the friction of the magnet during its displacement, which may now be effected in spite of the tightening of the screw V, solely by means of the stop screws S S', and without interfering with the four fastening screws.

In Fig. 1, the upper part E of the member C is provided with a screwthread in which is screwed the screw V, the magnet being pierced with a smooth hole, and the tightening takes place between the two branches of the C.

The said member may be simplified by screwing the screw V into the magnet, as shown in section in Fig. 6, the end of the screw V passing through a smooth hole in the part E, so as to constitute a supporting point for the reaction of the screws S and S'. The displacement is in like manner obtained in this case without loosening the base portion.

Fig. 7 shows an inexpensive form of construction which is obtained with a thinner metal, the part into which the screws S and S' are screwed being strengthened by a suitable folding at P and P' and the recesses $a\ b\ c$ may now be obtained by stamping, as shown in section on a larger scale in Fig. 8.

What I claim is:—

1. An arrangement for regulating the position of the damping magnets serving for the control of electric measuring apparatus, comprising a main frame, a forked member having the magnet disposed between its branches, a screwthreaded rod for securing the said member and the magnet to the main frame, three recesses formed in the lower branch of said forked member, three screws disposed on the frame and respectively adapted to engage the said recesses, and two stop screws provided upon the transverse portion of the forked member and adapted to bear upon the magnet so as to permit the changing of its inclination.

2. An arrangement for regulating the position of the damping magnets serving for the control of electric measuring apparatus, comprising a main frame, a forked member having the magnet disposed between its branches, a screwthreaded rod for securing the said member and the magnet to the main frame, three recesses formed in the lower branch of said forked member, three screws disposed on the frame and respectively adapted to engage the said recesses, and two stop screws provided upon the transverse portion of the forked member and adapted to bear upon the magnet so as to permit the changing of its inclination, and a washer interposed between the magnet and the lower branch of said forked member.

In testimony whereof I have signed this specification.

RENÉ MERCIER.